United States Patent
Jutzi

(10) Patent No.: US 8,051,458 B2
(45) Date of Patent: Nov. 1, 2011

(54) SYSTEM AND METHOD FOR DYNAMIC CHANNEL MANAGEMENT OF A TELEVISION BASED ON MEDIA CENTER SET-TOP BOX TUNER AVAILABILITY

(75) Inventor: Curtis E. Jutzi, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 1174 days.

(21) Appl. No.: 10/823,946

(22) Filed: Apr. 13, 2004

(65) Prior Publication Data

US 2005/0229203 A1 Oct. 13, 2005

(51) Int. Cl.
*H04N 7/16* (2011.01)

(52) U.S. Cl. ................... 725/151; 725/152; 725/153

(58) Field of Classification Search .......... 348/723–725, 348/731, 734; 725/14, 15
See application file for complete search history.

(56) References Cited

U.S. PATENT DOCUMENTS

| | | | | |
|---|---|---|---|---|
| 4,566,034 A | * | 1/1986 | Harger et al. ................. | 348/734 |
| 5,297,204 A | * | 3/1994 | Levine .......................... | 380/242 |
| 5,532,733 A | * | 7/1996 | Wignot ........................ | 725/151 |
| 5,900,916 A | * | 5/1999 | Pauley ............................ | 725/59 |
| 6,567,984 B1 | * | 5/2003 | Allport ........................ | 725/110 |
| 6,675,388 B1 | * | 1/2004 | Beckmann et al. ........... | 725/136 |
| 6,681,396 B1 | * | 1/2004 | Bates et al. .................... | 725/58 |
| 6,796,555 B1 | * | 9/2004 | Blahut ....................... | 370/395.1 |
| 6,876,970 B1 | * | 4/2005 | Silver et al. .................. | 704/275 |
| 2004/0068737 A1 | * | 4/2004 | Itoh et al. ........................ | 725/14 |
| 2004/0181814 A1 | * | 9/2004 | Ellis et al. .................... | 725/134 |
| 2005/0081245 A1 | * | 4/2005 | Arad et al. .................... | 725/100 |

* cited by examiner

*Primary Examiner* — Justin E Shepard

(74) *Attorney, Agent, or Firm* — Garrett IP, LLC

(57) ABSTRACT

A method and system for dynamic channel management of a television based on media center set-top box tuner availability. The method includes determining a last channel a television was tuned to prior to being turned off. Then it is determined whether the last channel is a radio frequency remodulated (RF-remodulated) channel. If the last channel is a RF-remodulated channel, then sending a signal to indicate that the television is on line with the RF-remodulated channel. If a tuner is not available for the television, then receiving an indication of a cable channel that was last RF-remodulated to the RF-remodulated channel for the television. Finally, changing the television to the cable channel.

12 Claims, 3 Drawing Sheets

SYSTEM AND METHOD FOR DYNAMIC CHANNEL MANAGEMENT OF A TELEVISION BASED ON MEDIA CENTER SET-TOP BOX TUNER AVAILABILITY

BACKGROUND

The convergence of the television receiver and the personal computer has accelerated with the advent of media center set-top computer systems. These systems, sometimes called set-top boxes, may use a conventional analog or digital television receiver as a display for computer systems. By combining the capabilities of a computer system and a television, the system may provide advanced television programming features, such as an electronic programming guide and time shifted viewing of broadcasted programs.

The set-top box may include personal video recorder (PVR) functionality. PVR is a generic term for a device that is similar to a video cassette recorder (VCR) but records television data in digital format as opposed to the VCR's analog format. A PVR allows a user to view a broadcasted program as a time shifted event. For example, the user may record a broadcasted program for later viewing, pause the broadcasted program and then resume watching the program at a convenient time for the user, replay a portion of the program, etc.

In a home environment, the set-top box may be set up to interface with multiple televisions using radio frequency remodulation (RF-remodulation). Here, the home cable is utilized by both the set-top box and the cable company. The cable company filters out certain frequencies to allow the cable subscriber to receive only the cable channels paid for by the subscriber. The set-top box takes the frequencies being filtered out by the cable company and puts a signal in those frequency spectrums. The set-top box transmits a NTSC signal to a television connected to coax cable or some other RF medium.

A user may view the same broadcasted program using two different scenerios. The first scenerio is when the user bypasses the set-top box and views the broadcasted program via cable only. For example, if the user is viewing the broadcasted program on cable channel 4, then the television must also be tuned to channel 4. Here, no time shifted functionality is available to the user.

In the second scenerio, the user may wish to view the broadcasted program on channel 4 with time shifted functionality. In this scenerio, the user needs to utilize the set-top box. But, if the set-top box is RF-remodulating on channel 101, for example, then the television must also be tuned to channel 101 for reception of cable channel 4. In the user's mind, he or she is viewing channel 4 even though the television is physically tuned to RF-remodulated channel 101.

In general, when the user turns the television off and returns later, the user expects the television to be automatically tuned to the last viewed channel (e.g., channel 4) once the television is turned back on. When channel 4 was last viewed via the first scenerio described above (e.g., directly on cable channel 4), the television automatically is tuned to channel 4 when it is turned back on. This is exactly what the user expects.

User confusion may present itself when channel 4 was last viewed by the user via the second scenerio described above (e.g., via set-top box and RF-remodulated channel 101) and the set-top box does not have a tuner available for the television when it is turned back on. Here, the set-top box must notify the user that no tuner is available for the television and that the television's remote control will not control the set-top box's tuner. Now, when the user presses channel down or channel up on the television's remote control, the channel is changed to either channel 100 or 102, respectively, and not channel 3 or 5 as the user anticipates. To avoid user confusion, the user must have a working knowledge of how the set-top box, the television and the remote control interact with each other. Unfortunately, many users do not have this working knowledge and don't care to learn.

BRIEF DESCRIPTION OF THE DRAWINGS

The invention may be best understood by referring to the following description and accompanying drawings that are used to illustrate embodiments of the invention. In the drawings.

DESCRIPTION OF THE EMBODIMENTS

Figure 1:
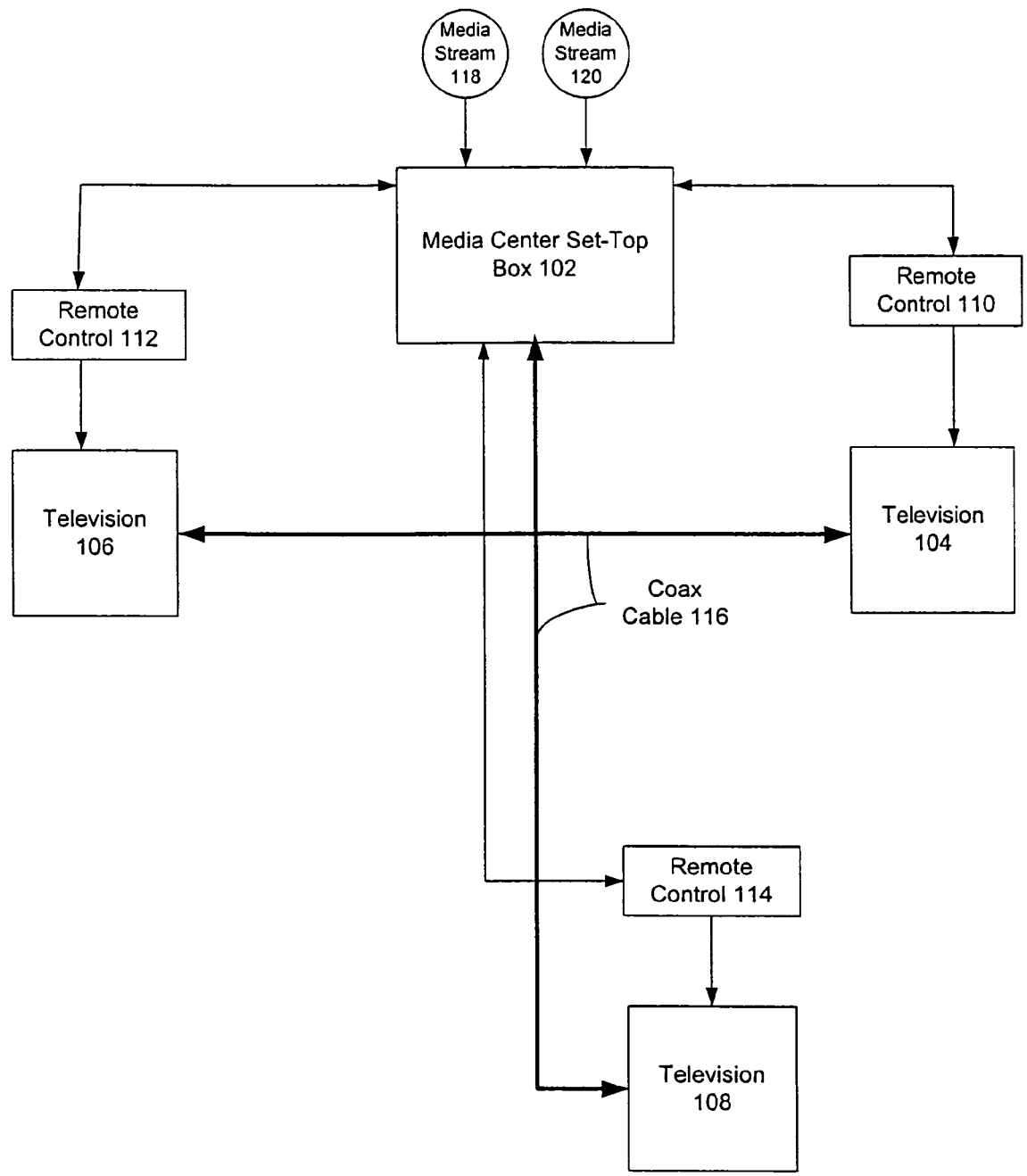
FIG. 1 illustrates one embodiment of an entertainment system environment in which some embodiments of the present invention may operate.

A method and system for dynamic channel management of a television based on media center set-top box tuner availability are described. The present invention helps to avoid user confusion when the set-top box is set up to interface with multiple televisions (or any component with a tuner) in a home using RF-remodulation and the set-top box does not always have a tuner available for every television for which it interfaces. In an embodiment of the invention, the set-top box may have less tuners than the number of televisions to which it interfaces.

For example, if the set-top box is RF-remodulating on channel 101, then the television must also be tuned to channel 101 for reception of cable channel 4. In the user's mind, he or she is viewing channel 4 even though the television is physically tuned to RF-remodulated channel 101. When the user turns the television off and returns later, the user expects the television to be automatically tuned to the last viewed channel (e.g., channel 4). If RF-remodulated channel 101 is being used by another television and there are no set-top box tuners available to allocate to the user's television, then the user receives indication of this and must bypass the set-top box if he or she wants to watch television. Confusion on part of the user may arise when the user presses channel up or channel down on the television's remote control because the television is physically tuned to RF-remodulated channel 101 and not cable channel 4 as the user last recalls. Thus, when the user presses channel up, for example, the television will tune to channel 102 (which may or not be a RF-remodulated channel or a cable channel) and not cable channel 5.

In an embodiment, the present invention provides each television that interfaces with the set-top box with a remote control that dynamically manages the channels of its television in order to satisfy user expectations when a set-top box's tuner is not available to the television. In the following description, for purposes of explanation, numerous specific details are set forth. It will be apparent, however, to one skilled in the art that embodiments of the invention can be practiced without these specific details.

Embodiments of the present invention may be implemented in software, firmware, and hardware or by any combination of various techniques. For example, in some embodiments, the present invention may be provided as a computer program product or software which may include a machine or computer-readable medium having stored thereon instructions which may be used to program a computer (or other electronic devices) to perform a process according to the present invention. In other embodiments, steps of the present invention might be performed by specific hardware components that contain hardwired logic for performing the steps, or by any combination of programmed computer components and custom hardware components.

Thus, a machine-readable medium may include any mechanism for storing or transmitting information in a form readable by a machine (e.g., a computer). These mechanisms include, but are not limited to, a hard disk, floppy diskettes, optical disks, Compact Disc, Read-Only Memory (CD-ROMs), magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals (e.g., carrier waves, infrared signals, digital signals, etc.) or the like.

Some portions of the detailed descriptions that follow are presented in terms of algorithms and symbolic representations of operations on data bits within a computer system's registers or memory. These algorithmic descriptions and representations are the means used by those skilled in the data processing arts to convey the substance of their work to others skilled in the art most effectively. An algorithm is here, and generally, conceived to be a self-consistent sequence of operations leading to a desired result. The operations are those requiring physical manipulations of physical quantities. Usually, although not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

FIG. 1 illustrates one embodiment of an entertainment system environment in which some embodiments of the present invention may operate. The entertainment center as described in FIG. 1 is able to support communication through coax cable or any other RF medium. Other types of communication supported by the entertainment center described in FIG. 1 may include wide area network (WAN) and local area network (LAN) connections, Bluetooth, Institute of Electrical and Electronics Engineers (IEEE) 802.11, universal serial bus (USB), 1394, intelligent drive electronics (IDE), peripheral component interconnect (PCI) and infrared. Other interfaces may be added or substituted for those described as new interfaces are developed and according to the particular application. The specific devices shown in FIG. 1 represent one example of a configuration that may be suitable for a consumer home entertainment system and is not meant to limit the invention.

Referring to FIG. 1, the entertainment system includes, but is not necessarily limited to, a media center set-top box 102, one or more televisions 104, 106 and 108, one or more remote controls 110, 112 and 114, coax cable 116, and media streams 118 and 120. Although three televisions and three remote controls are shown in FIG. 1, it is understood that any number of televisions and remote controls may be present. In addition, although two media streams are shown in FIG. 1, it is understood that any number of media streams may be present. Each of these components is described in more detail next.

In one embodiment of the present invention, media center set-top box 102 includes personal video recorder (PVR) functionality. PVR is a generic term for a device that is similar to a video cassette recorder (VCR) but records television data in digital format as opposed to the VCR's analog format. VCRs utilize analog tapes to record and play programs broadcast over television, but PVRs encode video data in MPEG-1 or MPEG-2 formats and store the data in a hard drive. In the case of digital media streams, the PVR routes the previously encoded digital media stream to local storage. PVRs may encode other types of data and other types of data may be added or substituted for those described as new types of data are developed and according to the particular application for the PVR.

PVRs have all of the same functionality of VCRs (recording, playback, fast forwarding, rewinding, pausing, etc.) plus the ability to instantly jump to any part of the program without having to rewind or fast forward the data stream. PVRs allow a user to view a broadcasted program as a time shifted event.

A PVR is also referred to as a hard disk recorder (HDR), digital video recorder (DVR), personal video station (PVS), or a personal TV receiver (PTR). An embodiment of the specific components utilized in media center set-top box 102 to provide dynamic channel management of a television based on media center set-top box 102 availability is described in more detail below with reference to FIG. 2.

Media streams 118 and 120 have several different possible input embodiments, including a television cable, a broadcast antenna, a satellite receiver, a video player, such as a tape or disk player, an audio player, such as a tape, disk or memory player, a digital device connected for example by an IEEE 1394 connection, and so forth. These inputs, after processing, selection and control (by media center set-top box 102), may be used to generate different outputs for a user. The outputs are received by one or more of televisions 104, 106 and 108.

Televisions 104, 106 and 108 may also be a monitor, projector, a conventional analog television receiver, or any other kind of perceivable video display with a tuner. The audio portion of the output may be routed through an amplifier, such as an audio/video (A/V) receiver or a sound processing engine, to headphones, speakers or any other type of sound generation device. The outputs may also be sent to an external recorder, such as a VTR, PVR, CD or DVD recorder, memory card, etc.

In an embodiment of the invention, televisions 104, 106 and 108 are coupled with remote controls 110, 112 and 114, respectively. As described above, each of remote controls 110, 112 and 114 dynamically manages the channels of its television in order to satisfy user expectations when a set-top box's tuner is not available to the television. In an embodiment and as shown in FIG. 1, each of remote controls 110, 112 and 114 has one-way communication with its television and two-way communication with media center set-top box 102. In another embodiment of the invention, each of remote controls 110, 112 and 114 has two-way communication with its television.

Media center set-top box 102 may also provide connectivity to external devices through, for example, a network port. The user interface is provided through, for example, remote controls 110, 112 and 114, or a keyboard (not shown in FIG. 1). Media center set-top box 102 may communicate with other devices through its own infrared port (not shown in FIG. 1). Removable storage device (not shown in FIG. 1) may allow for MP3 compressed audio to be stored and played later on a portable device or for camera images to be displayed on televisions 104, 106 and 108.

There are many different equipment configurations for the entertainment center using media center set-top box 102 of FIG. 1 and many different possible choices of equipment to connect. A typical home entertainment system, using typical currently available equipment, might be as follows. As inputs, this typical home entertainment system might have a television antenna and either a cable television or digital broadcast satellite (DBS) input to the tuner system of the media center set-top box. A VTR or DVD recorder might be connected as an input device and an output device. A CD player and an MP3 player might be added for music. Such a system might also include a wide screen high definition television and a surround sound receiver coupled to six or eight speakers. This same system would have a small remote control for the user and offer remote control from the media center to the television, receiver, VTR and CD player. An Internet connection and keyboard would allow for web surfing, upgrades and information downloads, while a computer network would allow for file swapping and remote control from or to a personal computer in the house.

It is to be appreciated that a lesser or more equipped entertainment system than the example described above may be preferred for certain implementations. Therefore, the configuration of the entertainment system will vary from implementation to implementation depending upon numerous factors, such as price constraints, performance requirements, technological improvements, or other circumstances. Embodiments of the invention may also be applied to other types of software-driven systems that use different hardware architectures than that shown in FIGS. 1 and 2.

Figure 2:
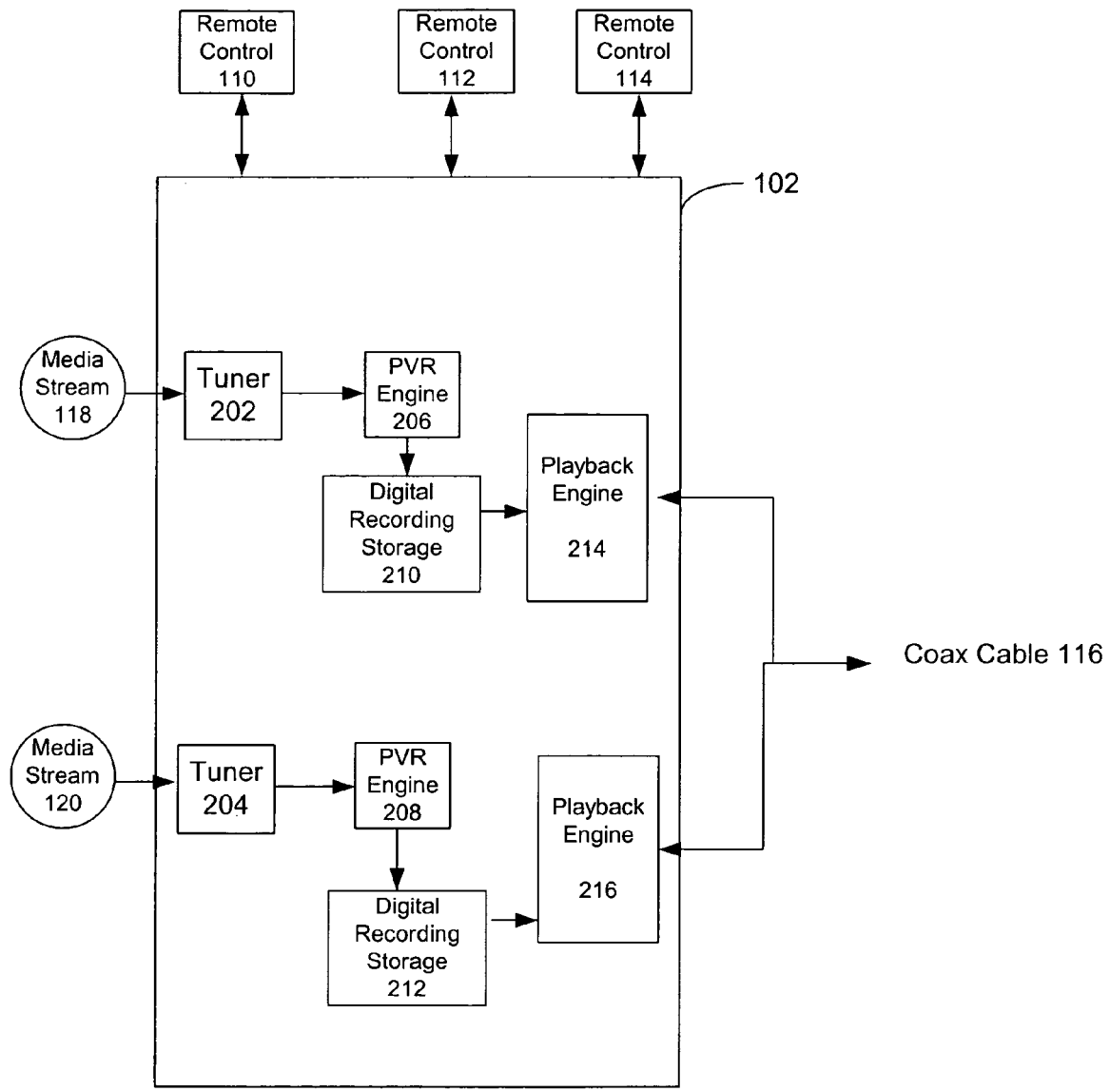
FIG. 2 illustrates one embodiment of a media center set-top box in which some embodiments of the present invention may operate.

FIG. 2 is a more detailed diagram of an embodiment of media center set-top box 102 of FIG. 1. FIG. 2 is shown for illustration purposes only and is not meant to limit the invention. As shown in FIG. 2, media center set-top box 102 includes, but is not necessarily limited to, one or more sets of PVR functionality components. As shown in FIG. 2, one set of PVR functionality components includes a tuner 202, a PVR engine 206, digital recording storage 210 and a playback engine 214. Media stream 118 feeds into tuner 202. The other set of PVR functionality components shown in FIG. 2 includes a tuner 204, a PVR engine 208, digital recording storage 212 and a playback engine 216. Media stream 120 feeds into tuner 204. It is important to note that the functionality of two or more of these components may be combined into one component. Each of these components is described next in more detail.

Tuners 202 and 204 can be any type of tuner capable of receiving media streams 118 and 120, respectively. Tuners 202 and 204 are assigned to PVR engines 206 and 208, respectively. In an embodiment, PVR engine 206 is an application module that coordinates activity of tuner 202 and digital recording storage 210 in order to provide PVR functionality. Likewise, PVR engine 208 is an application module that coordinates activity of tuner 204 and digital recording storage 212 in order to provide PVR functionality.

PVR engines 206 and 208 are responsible for trick mode functionality, such as pause, fast forward, skip forward, rewind, etc. PVR engines 206 and 208 are also responsible for recording media streams 118 and 120, respectively, (i.e., digital recordings), for managing use of hard disk space, and so forth. PVR engines 206 and 208 also are responsible for storing digital recordings in digital recording storage 210 and 212, respectively. Digital recording storage 210 and 212 are each an area of memory used to store digital recordings. Playback engines 214 and 216 read data from a digital recording stored in its respective digital recording storage and send the digital recording via coax cable 116 to be display on one or more of televisions 104, 106 and 108. Embodiments of the operation of the present invention are described next in more detail with reference to the flow diagram of FIG. 3.

Figure 3:
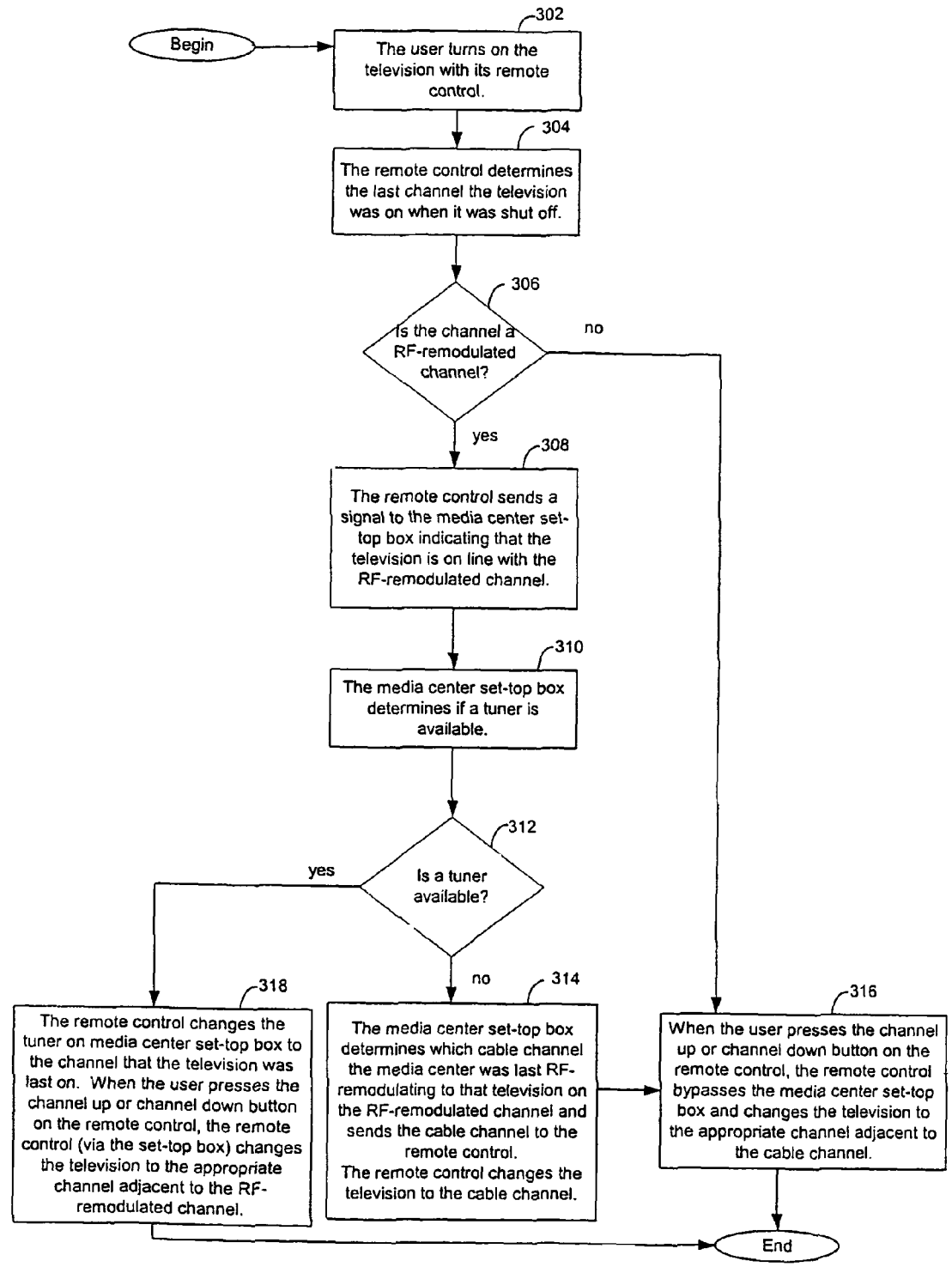
FIG. 3 is a flow diagram of one embodiment of a process for dynamic channel management of a television based on media center set-top box tuner availability.

FIG. 3 is a flow diagram of one embodiment of a process for dynamic channel management of a television based on media center set-top box tuner availability. Assume for illustration purposes only that RF-remodulation from media center set-top box 102 is on channels 101 and 102 and the cable company uses channels 2-90.

Referring to FIG. 3, the process begins at processing block 302 where the user turns on the television with its remote control (e.g., television 104 and remote control 110). In processing block 304, the remote control determines the last channel the television was on when it was last shut off.

In decision block 306, it is determined whether the last channel is a RF-remodulated channel. If not, then the last time the television was turned on it bypassed media center set-top box 102 and viewed the broadcasted program via the cable only. Here, the process continues at processing block 316 (described below). Alternatively, if at decision block 306 it is determined that the last channel was a RF-remodulated channel, then the last time the television was turned on it utilized media center set-top box 102 to view the broadcasted program. Here, the process continues at processing block 308.

At processing block 308, the remote control sends a signal to media center set-top box 102 indicating that the television is on line with the RF-remodulated channel. At processing block 310, media center set-top box 102 determines if a tuner (e.g., tuner 202 or tuner 204) is available for the television.

If at decision block 312, it is determined that a tuner in media center set-top box 102 is not available then the process continues at processing block 314. At processing block 314, media center set-top box 102 determines which cable channel it was RF-remodulating to the television on the RF-remodulated channel. Media center set-top box 102 then sends the cable channel to the remote control. The remote control changes the television to the cable channel. Here, assume that RF-remodulated channel was 101 and that media center set-top box 102 was RF-remodulating cable channel 4 to the television. Since there is no tuner available for the television, the remote control must bypass media center set-top box 102 and access the cable directly. Thus, the remote control changes the television to cable channel 4. The process continues at processing block 316.

At processing block 316, when the user presses the channel up or channel down button on the remote control, the remote control bypasses media center set-top box 102 and changes the television to the appropriate channel adjacent to the cable channel. In the above illustration, the remote control changes the television to channel 5 if the user presses channel up and changes the television to channel 3 if the user presses channel down. The process of FIG. 3 ends at this point.

If at decision block 312, it is determined that a tuner in media center set-top box 102 is available then the process continues at processing block 318. At processing block 318, the remote control changes the tuner in media center set-top box 102 to the channel to which the television was previously tuned. When the user presses the channel up or channel down button the remote control, the remote control (via media center set-top box 102) changes the television to the appropriate channel adjacent to the RF-remodulated channel. The process of FIG. 3 ends at this point.

A method and system for dynamic channel management of a television based on media center set-top box tuner availability have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   determining, by a remote control, a last channel to which a television was tuned prior to the television being turned off;
   determining, by the remote control, whether the last channel tuned to prior to being turned off was a radio frequency remodulated (RF-remodulated) channel via a media center set-top box;
   if the last channel was an RF-remodulated channel, then sending, from the remote control, a signal to the media center set-top box to indicate that the television is on line with the RF-remodulated channel;
   if a tuner in the media center set-top box is not available for the television, then receiving at the remote control, from the media center set-top box, an indication identifying a cable channel that was most recently RF-remodulated for transmission on the RF-remodulated channel for the television; and
   automatically changing the television with the remote control to the identified cable channel to satisfy expectations of a user when the tuner is not available for the television, wherein the remote control is separate from the media center set-top box.

2. The method of claim 1, further comprising:
   receiving, by the remote control, a channel up signal; and
   changing the television to an adjacent cable channel one above the cable channel with the remote control.

3. The method of claim 1, further comprising:
   receiving, by the remote control, a channel down signal; and
   changing the television to an adjacent cable channel one below the cable channel with the remote control.

4. A system, comprising:
   a television;
   a remote control coupled to the television; and
   a media center set-top box, wherein the remote control determines a last channel to which the television was tuned prior to the television being turned off, wherein the remote control determines whether the last channel tuned to prior to being turned off was a radio frequency remodulated (RF-remodulated) channel, wherein the remote control sends a signal to the media center set-top box to indicate that the television is on line with the RF-remodulated channel if the last channel was a RF-remodulated channel, wherein the remote control receives an indication from the media center set-top box, the indication identifying a cable channel that was most recently RF-remodulated for transmission on the RF-remodulated channel for the television if a tuner in the media center set-top box is not available for the television, and wherein the remote control automatically changes the television to the identified cable channel to satisfy expectations of a use when the tuner is not available for the television,
   wherein the remote control is separate from the media center set-top box.

5. The system of claim 4, wherein the remote control receives a channel up signal, and wherein the remote control changes the television to an adjacent cable channel one above the cable channel.

6. The system of claim 4, wherein the remote control receives a channel down signal, and wherein the remote control changes the television to an adjacent cable channel one below the cable channel.

7. A non-transitory medium containing instructions which, when executed by a processing system, cause the processing system to perform a method, the method comprising:
   determining, by a remote control, a last channel to which a television was tuned prior to the television being turned off;
   determining, by the remote control, whether the last channel tuned to prior to being turned off was a radio frequency remodulated (RF-remodulated) channel via a media center set-top box;
   if the last channel was an RF-remodulated channel, then sending, from the remote control, a signal to the media center set-top box to indicate that the television is on line with the RF-remodulated channel;
   if a tuner in the media center set-top box is not available for the television, then receiving at the remote control, from the media center set-top box, an indication, the indication identifying a cable channel that was most recently RF-remodulated for transmission on the RF-remodulated channel for the television; and
   automatically changing the television with the remote control to the identified cable channel to satisfy expectations of a user when the tuner is not available for the television, wherein the remote control is separate from the media center set-top box.

8. The non-transitory medium of claim 7, further comprising:
   receiving, by the remote control, a channel up signal; and
   changing the television to an adjacent cable channel one above the cable channel with the remote control.

9. The non-transitory medium of claim 7, further comprising:
receiving, by the remote control, a channel down signal; and
changing the television to an adjacent cable channel one below the cable channel with the remote control.

10. An apparatus comprising:
a remote control, wherein the remote control determines a last channel to which a television was tuned prior to the television being turned off, wherein the remote control determines whether the last channel tuned to prior to being turned off was a radio frequency remodulated (RF-remodulated) channel via a media center set-top box, wherein the remote control sends a signal to the media center set-top box to indicate that the television is on line with the RF-remodulated channel if the last channel was a RF-remodulated channel, wherein the remote control receives an indication from the media center set-top box, the indication identifying a cable channel that was most recently RF-remodulated for transmission on the RF-remodulated channel for the television if a tuner in the media center set-top box is not available for the television, and wherein the remote control automatically changes the television to the identified cable channel to satisfy expectations of a use when the tuner is not available for the television,
wherein the remote control is separate from the media center set-top box.

11. The apparatus of claim 10, wherein the remote control receives a channel up signal, and wherein the remote control changes the television to an adjacent cable channel one above the cable channel.

12. The apparatus of claim 10, wherein the remote control receives a channel down signal, and wherein the remote control changes the television to an adjacent cable channel one below the cable channel.

* * * * *